P. Cook
Saw.
No. 87,092. Patented Feb. 23, 1869.

Witnesses;
Louis Furrer.
Geo. W. Miatt.

Inventor;
Peter Cook
by J. Fraser & Co.
Attys.

United States Patent Office.

PETER COOK, OF TONAWANDA, NEW YORK.

*Letters Patent No. 87,092, dated February 23, 1869.*

IMPROVEMENT IN SAW-TEETH.

The Schedule referred to in these Letters Patent and making part of the same.

*To all whom it may concern:*

Be it known that I, PETER COOK, of Tonawanda, in the county of Erie, and State of New York, have invented a new and useful Improvement in the Construction of Saws; and I do hereby declare that the following is a full and exact description thereof, reference being had to the accompanying drawings, making part of this specification, in which—

Like letters of reference designate corresponding parts in all the figures.

Figure 1:
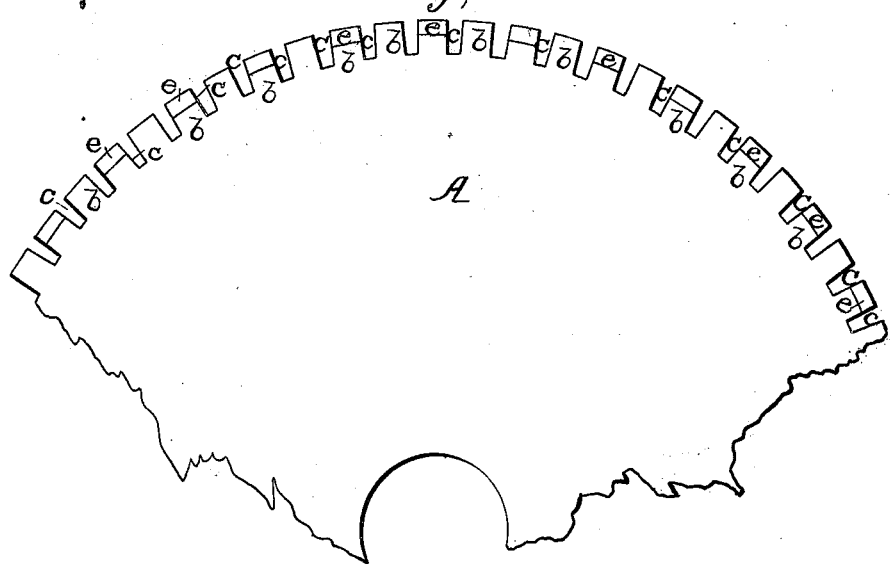
Figure 1 is a side elevation of a segmental portion of a circular saw, constructed after my improved manner.
Figure 2:
Figure 2 is a section of the same cut by a radial plane.

The nature of my invention consists in so constructing saws, that their teeth consist each of a section of a circle of the saw, the cutting-edge forming a plane upon the periphery, and the sides at right angles with the periphery, or nearly so.

By this construction the cutting is effected by the advancing motion of the feed against the periphery, the teeth acting as chisels, and cutting the fibre smoothly, instead of rending or tearing them transversely, as with the ordinary angular teeth, while the kerf is effectually cleared of chips and shavings by the square edges which form the dividing notches between the teeth.

In the drawings—

A represents a portion of a circular saw,

*b b*, the teeth, and

*c c*, the intervening recesses.

The teeth are formed by cutting the notches or recesses *c*, which I prefer to make rectangular at their base, as shown, so as to enable a rectangular file to be used in sharpening the saw. They may, however, be made with a concave base, such as would be formed by using a round file.

The teeth are "set" in the ordinary manner, and sharpened at their outer edge by bevelling on the side opposite the direction of the "set," as represented at *e e*, so that each tooth will be bevelled on the side of the saw opposite that of the next or proximate one.

This mode of constructing the teeth brings the outer and sharpened edge of each in line with the plane of the saw, instead of at right angles or obliquely, as in the ordinary angular or pointed form of teeth.

Figure 3:
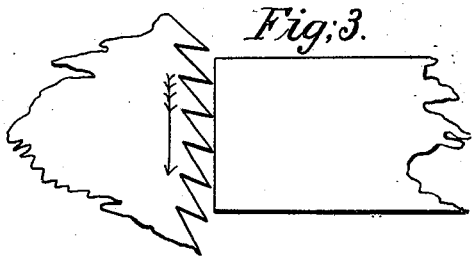

Saws with the ordinary construction of teeth, operate with a kind of scraping action; that is, the line of the edge of the point of the tooth is nearly at right angles to the direction of motion of the tooth, as shown in diagram, fig. 3.

Figure 4:
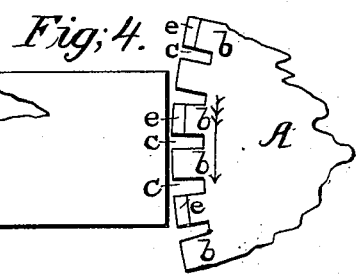
Figures 3 and 4 are diagrams, respectively illustrating the mode of operation of the old and my improved saw.

With my mode of construction, the extremity and edge of the tooth are in line or coincident with the direction of motion, as shown in diagram, fig. 4; the teeth cutting in the manner of a knife, at the greatest mechanical advantage, with but a slight inclination of the cutting-edge from the surface being cut, as clearly represented in diagram, fig. 4.

The advantages of my improvement are as follows:

First, the great amount of cutting-edge, as the greater portion of the periphery of the saw is used for the purpose, instead of a few angular points, which soon become dull, requiring to be frequently sharpened.

Second, my improved saw cuts at the greatest mechanical advantage, and requires less power to perform the same amount of work than any other with which I am acquainted.

Third, when the front portions of the teeth become dull, the saw can be reversed on its arbor, and run for an equal period of time without sharpening.

Fourth, it can be more rapidly put in order, and with a great saving in files, as there are no acute angles to be cut, requiring a triangular file, which soon becomes used up; and it is more readily set.

Fifth, the great advantage, however, of my improvement, is the extremely smooth surface of the cut which is produced by my saw, rendering the use of the plane, for finishing, unnecessary for ordinary purposes, and thereby saving a great amount of labor in the various branches of manufacture.

I do not claim a saw having teeth, the cutting-edges of which are inclined or eccentric to the axis of the saw; but

What I claim as my invention, and desire to secure by Letters Patent, is—

The improved mode of constructing saws, herein described, in which the teeth are formed in sections, with square or chisel-edges on the periphery thereof, substantially as and for the purposes set forth.

In witness whereof, I have hereunto signed my name, in the presence of two subscribing witnesses.

PETER COOK.

Witnesses:
JAY HYATT,
ALBERT HAIGHT.